T. Crane,
Stump Elevator.
No. 2,228. Reissued Apr. 17, 1866.
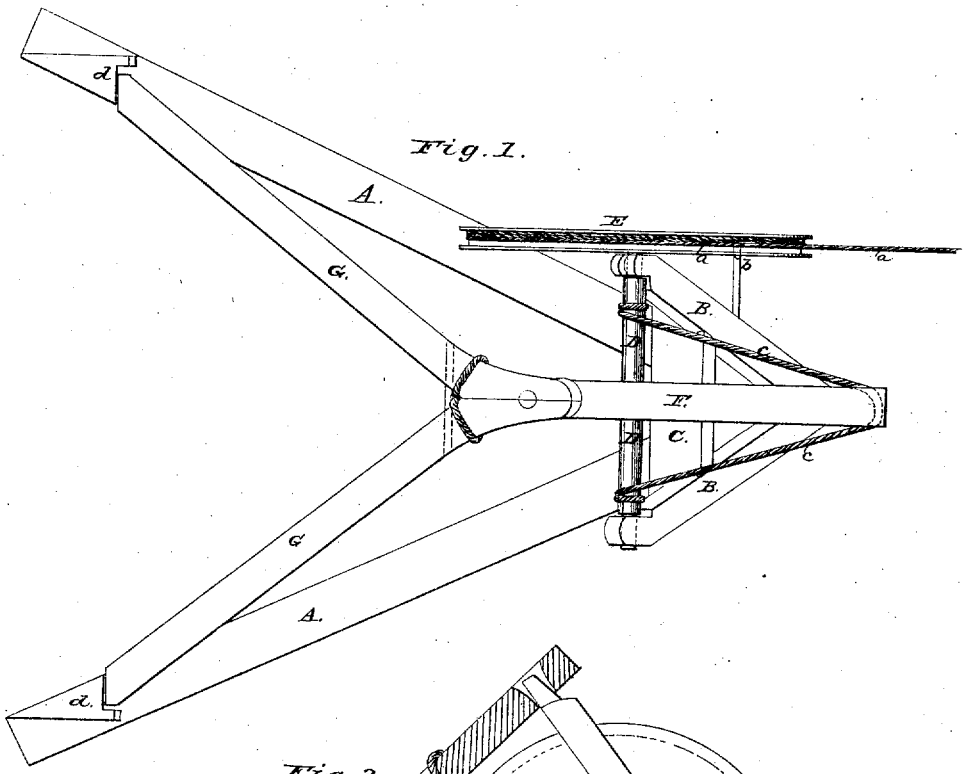
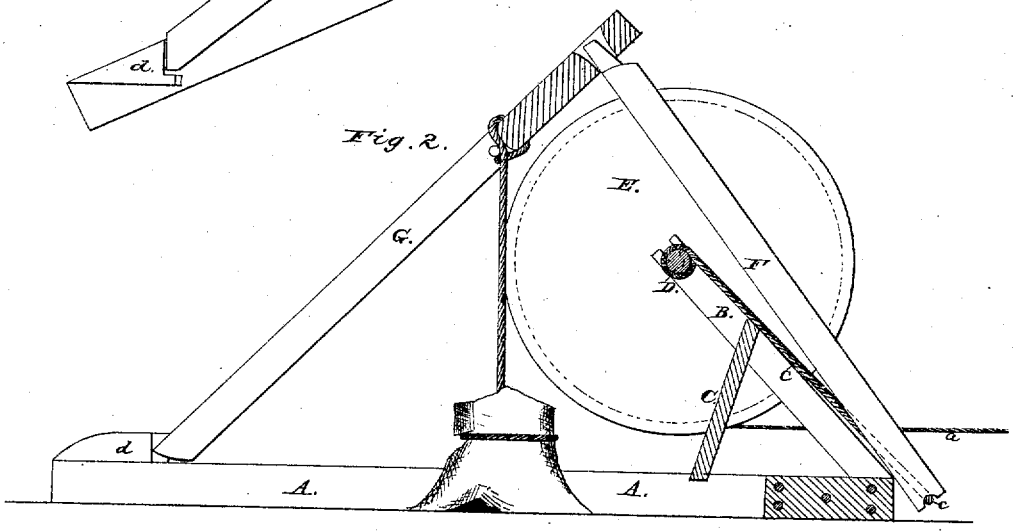
Witnesses:
R. Hampson.
Edw. Schafer.
Inventor.
Thomas Crane
by his Attys
Mason Fenwick & Lawrence
AM. PHOTO-LITHO. CO. N.Y. (OSBORNE'S PROCESS)

UNITED STATES PATENT OFFICE.

THOMAS CRANE, OF FORT ATKINSON, WISCONSIN.

IMPROVEMENT IN STUMP-EXTRACTORS.

Specification forming part of Letters Patent No. 50,690 dated October 31, 1865; Reissue No. 2,228, dated April 17, 1866.

*To all whom it may concern:*

Be it known that I, THOMAS CRANE, of Fort Atkinson, Jefferson county, State of Wisconsin, have invented a new and Improved Stump-Extractor; and I do hereby declare that the following is a full, clear, and exact description thereof, reference being had to the accompanying drawings, making a part of this specification, in which—

Figure 1 is a plan view of my improved machine. Fig. 2 is a vertical section longitudinally through the center of the machine.

Similar letters of reference indicate corresponding parts in the two figures.

This invention relates to a novel machine for extracting stumps of trees, roots, and large stones from the ground for the purpose of clearing land which it is desired to put under cultivation, as will be hereinafter described.

To enable others skilled in the art to understand my invention, I will describe its construction and operation.

In the accompanying drawings, A A represent two sill-beams, which are firmly united together, so as to form two sides of a triangle, and thus afford a wide base, support for the parts which are employed to extract the stumps. By thus uniting the sill-beams they will admit of a stump between them, as indicated in Fig. 2. To the forward ends of these two beams, where they are united together, two beams, B B, are securely framed, which are also converging, and which are supported in inclined positions by means of an inclined piece of timber, C, as shown in Figs. 1 and 2. The upper ends of the beams B B are adapted for serving as bearings for a horizontal transverse shaft or windlass, D, which carries on one end a large pulley, E, that has an annular groove in its periphery for receiving a rope or chain, *a*, which is wound upon this pulley and suitably secured to it. The rope or chain *a* is carried off from the lower side of said pulley and passed through an eye, *b*, which keeps the rope in proper position during the operation of the machine. A rope or chain, *c*, is attached at both ends to the shaft D, and receives the lower notched end of an inclined lifting-bar, F, which bar extends upward over the shaft D to a suitable height, and is attached to the upper united ends of the two beams G G, as shown in Figs. 1 and 2, so as to form a kind of joint. The lower ends of the two beams G G′ are supported upon the ends of the sill-beams A A, and are kept in place thereon by means of stop-blocks *d d*, which not only prevent the beams G G′ from slipping backward, but also prevent them from spreading apart.

The three beams G, G′, and F form a tripod when put together and erected in the position shown in Figs. 1 and 2, and to the crotch of the two united beams G G of the tripod a rope or chain, *g*, is attached, to the lower end of which the stump or stone to be extracted is attached, so that when power is applied to the bar F to lift the upper ends of the united beams G G both of these beams will mutually sustain the load to be lifted.

The operation of my machine is as follows: The team is hitched to the pulley-rope *a*, the machine being properly adjusted over a stump, as shown in Fig. 2, and the tripod erected over it. The lower end of the lifting-beam F is seated upon the rope or chain stirrup *c*, and the rope or chain *g* is attached to the stump. The team is now moved off so as to turn pulley E and with it the shaft D, which winds up the chain *c* slowly, thus lifting the beam F and raising the upper ends of the beams G G.

It will be seen from the above description that the strain upon the three lifting-beams G G and F is nearly in a line with their length, that upon the lifting-beam is exactly so; hence these timbers can be made very light and yet possess a sufficient amount of strength.

Having thus described my invention, what I claim as new, and desire to secure by Letters Patent, is—

1. So constructing a stump pulling machine that a draft on the chain or cord causes the frame to form an angle, which is less obtuse than the angle which it forms at the commencement of the operation, and thus an upward draft on the stump is produced, substantially as described.

2. The combination of the triangular lifting-frame G G with the lifting-beam F, substantially as described.

3. The combination of the tripod lifting-frame G G and F, the triangular base A, and a windless, D, operating substantially as described.

4. Sustaining the lower end of the lifting-beam F upon a rope or chain, *c*, of the windlass D, substantially as described.

5. The combination of the pulley E, draft-rope *a*, windlass D, stirrup-chain *c*, and the lifting-beam of the tripod, substantially as described.

THOMAS CRANE.

In presence of—
OLIVE I. CRANE,
GEO. H. STAFFORD.